United States Patent [19]

Pickens

[11] 4,205,394
[45] May 27, 1980

[54] SEALED CAVITY HYDROPHONE ARRAY CALIBRATION

[75] Inventor: George O. Pickens, San Diego, Calif.

[73] Assignee: The United States of America as represented by the Secretary of the Navy, Washington, D.C.

[21] Appl. No.: 957,391

[22] Filed: Nov. 3, 1978

[51] Int. Cl.² ............................................. H04R 29/00
[52] U.S. Cl. ....................................................... 367/13
[58] Field of Search ........................ 340/5 C; 73/1 DV

[56] References Cited

U.S. PATENT DOCUMENTS

| | | | |
|---|---|---|---|
| 3,859,620 | 1/1975 | Percy | 340/5 C |
| 3,864,664 | 2/1975 | Trott et al. | 340/5 C |

Primary Examiner—Richard A. Farley
Attorney, Agent, or Firm—Richard S. Sciascia; Ervin F. Johnston; James O. Skarsten

[57] ABSTRACT

Apparatus and method for calibrating a hydrophone array comprising a plurality of electrically interconnected hydrophones over a range of acoustic signal frequencies having a lower limit on the order of 1 Hz. Apparatus includes a container having a sealed cavity for sealing the hydrophone array in a selected fluid, an electro-acoustic projector for projecting acoustic signals of frequencies selected from the frequency range into the sealed cavity, and a reference hydrophone contained within the sealed cavity for generating a reference signal in response to each projected acoustic signal. Apparatus further includes monitoring equipment coupled to the reference hydrophone and to the hydrophone array for enabling a selected characteristic of one of the reference signals to be compared with the same characteristic of a signal generated by the hydrophone array when an acoustic signal is projected into the sealed cavity.

12 Claims, 4 Drawing Figures

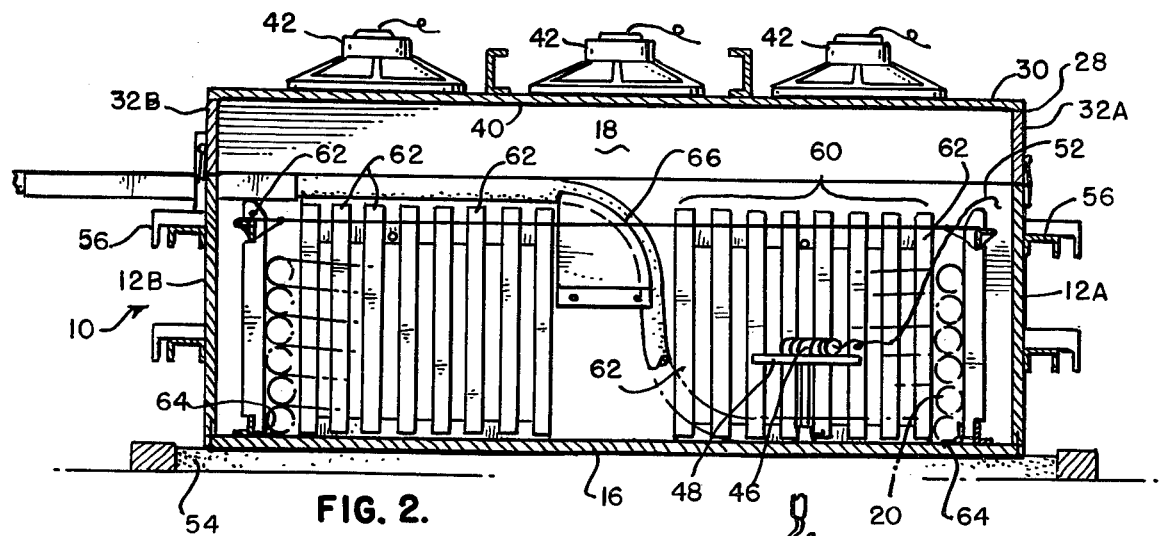
FIG. 2.
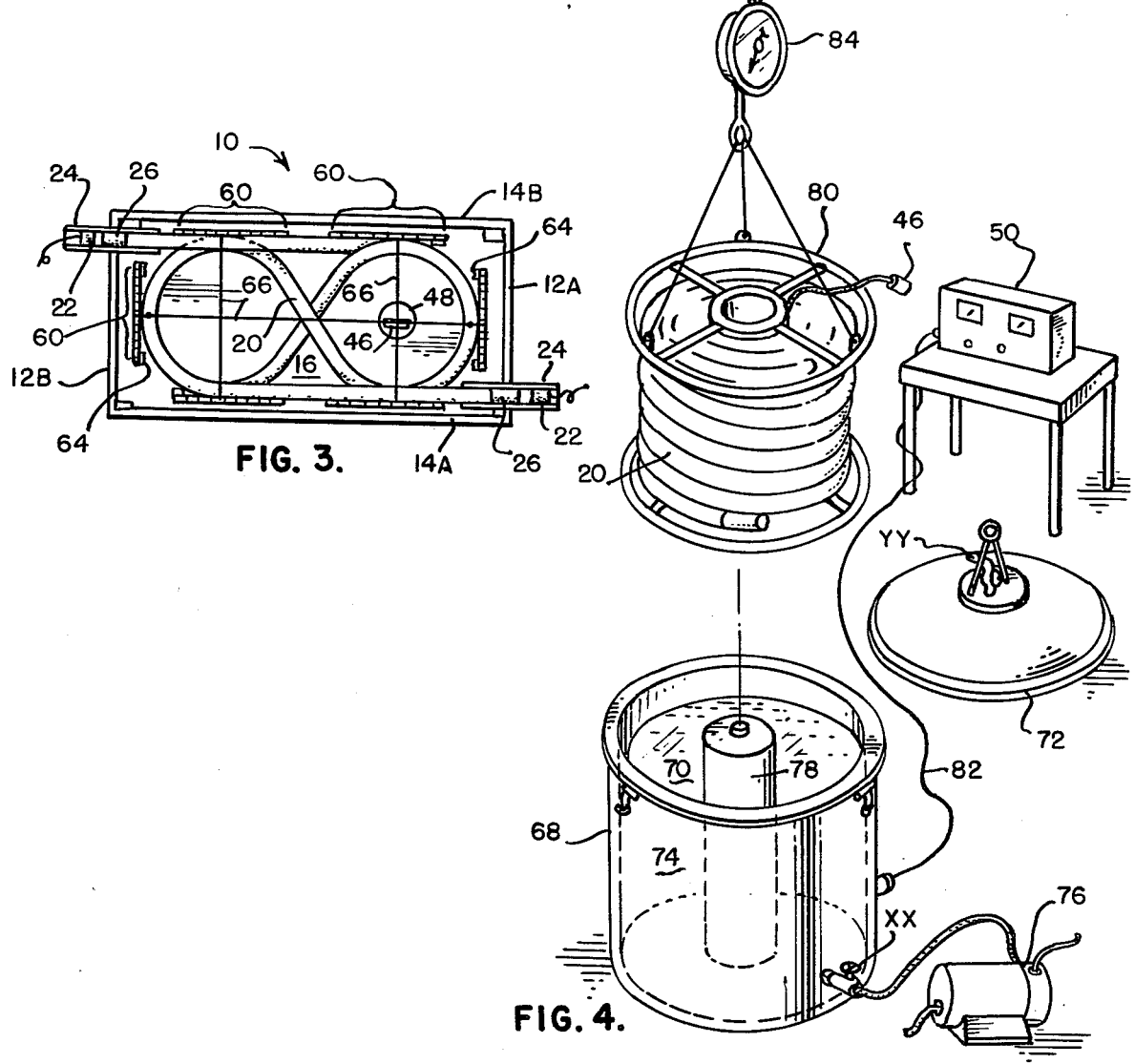
FIG. 3.
FIG. 4.

SEALED CAVITY HYDROPHONE ARRAY CALIBRATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The apparatus disclosed and claimed herein pertains generally to the field of calibrating a hydrophone array comprising a plurality of hydrophones which are electrically interconnected in a generally elongated configuration. More particularly, the invention pertains to such calibration wherein apparatus is employed which is portable or highly transportable, and which provides a sealed cavity in which the hydrophone array and a selected fluid are contained during calibration. Even more particularly, the invention pertains to the field of calibrating an elongated or linear array of hydrophones down to frequencies on the order of 1-2 Hz, in the absence of a substantial or non-transportable body of water.

It is presently well known in the art to electrically interconnect individual hydrophones into arrays which are to be used for gathering acoustic data. In such arrays, which have important commercial and military applications in detecting acoustic signals present in ocean areas, all of the individual hydrophones cooperate or interact to provide a beam forming or direction-sensing capability. Such arrays are usually linear, and comprise a number of hydrophones distributed over a length which may be in excess of 300 feet. However, it is likewise well known that the detection capabilities of individual hydrophones in an array may unpredictably vary over a period of time. Consequently, to accurately interpret acoustic information sensed by a hydrophone array, it is necessary to calibrate the array, that is, to determine the response provided by the cooperatively functioning hydrophones thereof to various frequencies over an acoustic frequency range.

Calibration of a linear hydrophone array in the VLF range, i.e. the frequency range of approximately 1 to 100 Hz, has been found to be particularly difficult. In the past, it has been found necessary to deploy a linear array in open ocean, and project VLF signals thereto from an acoustic generator spaced many miles therefrom. More recently, U.S. Pat. No. 3,859,620, issued Jan. 7, 1975 to Joseph L. Percy, discloses apparatus for calibrating a linear hydrophone array, or line array, down to a frequency of 10 Hz, the apparatus including a cylindrically shaped wire mesh framework. The array is helically coiled within the frameworks, and then both framework and coiled array are suspended into a water-filled test tank, into which acoustic signals are projected over a calibration frequency range. The Percy patent teaches that it is very important that the framework enclosing the array be transparent to acoustic waves. According to Percy, the array should not be contained in an enclosure having solid walls, to prevent the generation of interfering acoustic energy, or standing waves, during calibration. Also, Percy stresses the need to make the test tank acoustically non-reflective, so that a test facility may have to be specially designed for hydrophone array calibration.

The United States Navy makes extensive use of linear hydrophone arrays. Prior to the present invention, it was necessary for the Navy to transport virtually all of its arrays to an immobile specially constructed facility for VLF calibration. A hydrophone array could therefore experience much more movement and handling than was necessary for its actual deployment and operation as an acoustic sensor, whereby the cost of gathering acoustic data was measurably increased.

In the past, individual hydrophones have been calibrated in sealed enclosures or cavities. However, linear arrays of hydrophones may comprise twenty or more discrete hydrophone elements, distributed over lengths in excess of 300 feet. The prior art generally taught, as indicated by the Percy patent, the undesirability of enclosing such arrays in a solid shell during calibration. Yet it has been anticipated that if a linear array could be calibrated within a sealed enclosure, the requirement that a special test tank for VLF calibration could be eliminated. In addition, if the structure enclosing an array during calibration was sufficiently transportable to be moved to sites at which the array was deployed and operated, the need to move and handle arrays would be substantially reduced, and significant cost savings could be achieved.

SUMMARY OF THE INVENTION

The present invention provides apparatus for calibrating a linear or elongated array of electrically interconnected hydrophones over a range of acoustic signal frequencies having lower and upper limits, the apparatus including a container means having a sealed cavity of selected dimensions for sealing the hydrophone array in a selected fluid, and projecting means, for projecting acoustic signals of frequencies selected from the frequency range into the sealed cavity. The apparatus further includes reference hydrophone means contained within the sealed cavity for generating a reference signal in response to each of the projected acoustic signals, and means coupled to the reference hydrophone means for enabling a selected characteristic of one of the reference signals to be compared with the same characteristic of a signal which is generated by the hydrophone array when an acoustic signal is projected into the sealed cavity. An embodiment of the invention has been found to provide accurate calibrations of linear hydrophone arrays down to frequencies on the order of 1-2 Hz.

Preferably, the projecting means comprises a plurality of electro-acoustic speaker means, and each of the speaker means comprises means for projecting acoustic signals into a different portion of the volume of the sealed cavity, the dimensions of each of the volume portions being equal. The projecting means preferably includes further a means coupled to the speaker means for driving the speaker means so that all of the acoustic signals projected into the sealed cavity by the speaker means at a given time are in phase and of the same frequency, whereby standing wave interference is avoided or minimized.

The container means of the apparatus preferably comprises a plurality of flat walls which are joined to form the sealed cavity, one of the walls comprising a first wall which contains each of the speaker means, and other of the walls being provided with rigid means for resisting deformation of the sealed cavity by acoustic signals projected into the sealed cavity. Also, and more importantly, the rigid means stiffens the walls respectively provided therewith to resist vibration of the walls, which might be caused either by the acoustic waves projected into the sealed cavity by the speakers, or by acoustic disturbances which are external to the sealed cavity. Even comparatively minor wall vibrations, if mechanically coupled to the hydrophones of the array, either through direct contact or through the fluid enclosed in the cavity, could cause serious errors in the electrical response of the hydrophones.

In a preferred embodiment of the apparatus, the fluid in the sealed cavity comprises air, and the first wall of the container means and a second wall thereof are in spaced parallel relationship, the first wall and the second wall both having flat rectangular surfaces facing inwardly, or toward the sealed cavity, the rectangular surfaces being separated by a linear dimension which is substantially smaller than the wavelength of an acoustic signal having a frequency equal to the upper frequency limit of the aforementioned frequency range. It is desirable that such container means, and each of the other components of the apparatus, be sufficiently portable to be transported to a location which is at, or readily accessible to, the site of deployment and operation of hydrophone arrays which are to be calibrated thereby.

In a modification of the above apparatus, which is very useful for increasing the upper limit of the calibration frequency range, the container means comprises a pressure vessel for providing a sealed cylindrically shaped cavity of selected radius and height which is filled with a selected liquid, such as water, when the hydrophone array is being calibrated. Projecting means of the modification comprises a means for projecting acoustic signals from the cylindrical axis of the sealed cavity outwardly toward the inner walls of the pressure vessel, and the modification further includes means coupled to the pressure vessel for maintaining a selected hydrostatic pressure within the pressure vessel during calibration.

The present invention also provides a method for calibrating an elongated array of electrically interconnected hydrophones over a range of acoustic signal frequencies having lower and upper frequency limits. The method comprises the steps of helically coiling the hydrophone array in a cavity filled with a selected fluid, the coil having a loop of selected height; placing a reference hydrophone in the cavity in selected relationship with the coiled hydrophone array, the reference hydrophone generating a reference signal upon receiving an acoustic signal; sealing the cavity to retain the fluid therein; projecting acoustic signals of frequencies selected from the frequency range into the sealed cavity; and comparing a selected characteristic of a reference signal generated by the reference hydrophone in response to a given projected acoustic signal with the same characteristic of a signal which is generated by the hydrophone array in response to the given acoustic signal.

OBJECTS OF THE INVENTION

An object of the invention is to provide an improved system for calibrating an elongated hydrophone array, particularly at frequencies in the VLF range, which may have a lower limit on the order of 1-2 Hz.

Another object is to provide a system for hydrophone array calibration which allows calibration to be accomplished in the absence of a non-transportable body of water.

Another object is to provide a system for hydrophone array calibration which may be readily transported to the vicinity of array deployment and operation or to other location which is convenient for array calibration.

Another object is to provide a system which provides for the calibration of a hydrophone array within a sealed cavity, while overcoming interference from standing waves or other reflective acoustic energy generated within the cavity.

Another object is to provide a portable system in which a hydrophone array is calibrated within a sealed cavity, wherein the walls of the cavity are sufficiently stiffened to resist vibration thereof and to prevent vibrations generated therein, either by acoustic calibrating signals or by acoustic disturbances external to the cavity, from interfering with calibration.

Another object is to provide means for calibrating a linear hydrophone array or array segment which is comparatively simple and inexpensive.

These and other objects of the invention will become more readily apparent from the ensuing specification taken together with the drawings.

BRIEF DESCRIPTION OF THE DRAWINGS

FIG. 2 is a sectional view of the embodiment of FIG. 1 taken generally along line 2—2 of FIG. 1 with the cover thereof in place.

FIG. 3 is a plan view of the embodiment of FIG. 1, the cover being removed therefrom.

FIG. 4 is a perspective view showing a modification of the invention.

DESCRIPTION OF THE PREFERRED EMBODIMENT

Figure 1:
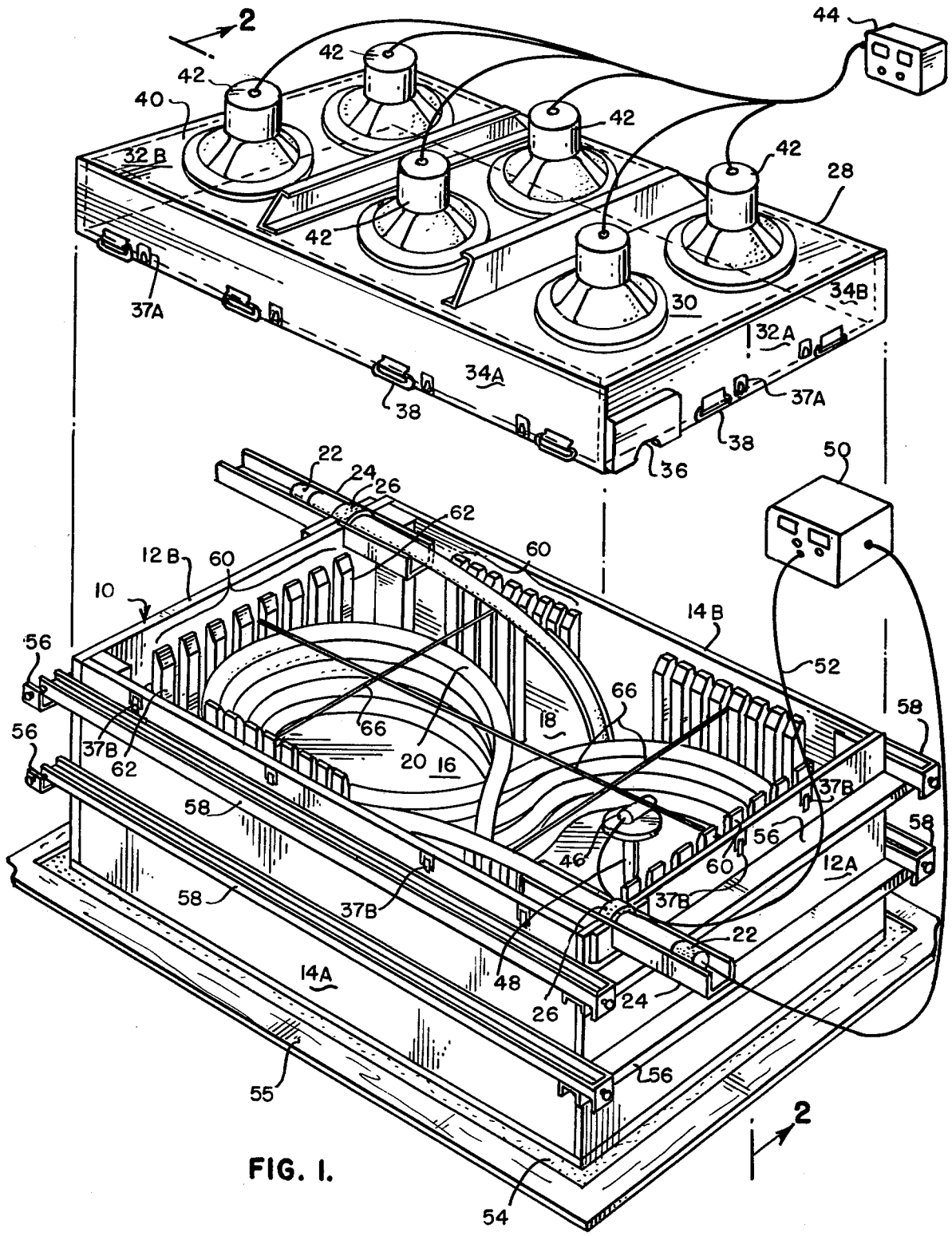
FIG. 1 is a perspective view showing an embodiment of the invention employed to calibrate a linear hydrophone array.

Referring to FIGS. 1-3, there is shown a box-like structure 10 comprising two flat rectangular shaped side walls 12A and 12B, two other flat rectangular shaped side walls 14A and 14B, and a flat rectangular shaped lower wall 16. Side walls 12A and 12B are fixed in spaced parallel relationship with each other, and in orthogonal relationship with lower wall 16, a lower edge of each of the side walls 12A and 12B abutting one of the edges of lower wall 16 and forming a joint therewith which is substantially air tight. In like manner, side walls 14A and 14B are fixed in spaced parallel relationship with each other and in orthogonal relationship with lower wall 16, a lower edge of each of the side walls 14A and 14B abutting an edge of lower wall 16 and forming an air tight joint therewith. Side walls 14A and 14B are each fixed in orthogonal relationship with both side walls 12A and 12B, and side walls 14A and 14B each have side edges abutting side edges of side walls 12A and 12B along joints which are air tight.

Side walls 12A, 12B, 14A and 14B and lower wall 16 all may usefully be formed of one inch plywood. By joining the side walls and lower wall as described above, a portion of a cavity 18 is formed, cavity 18 having dimensions described hereinafter.

Referring to FIGS. 1 and 3, there is shown hydrophone array 20 coiled within cavity 18 in a figure-eight pattern. Hydrophone array 20 is a linear hydrophone array having a length of 150 feet and which is of a type commonly used for acoustic detection in an ocean area. Array 20 may comprise either one or a multiple of separate acoustic channels contained within a protective hose, each channel comprising 20 discrete hydrophones connected in series and parallel combinations and distributed along the length of the hose. Each end of array 20 is terminated by a coupling 22 so that array 20 may be mechanically and electrically joined to other linear hydrophone arrays similar thereto to form an extended linear array having a length of up to one mile in length, hydrophone array 20 thereby comprising a segment of such extended array. By employing the structure shown in FIG. 1, each of the segments comprising a total array can be successively calibrated without their having to be electrically and mechanically decoupled from one another.

Side walls 12A and 12B are each penetrated by a channel 24 which is dimensioned to receive and support an end of hydrophone array 20 when the array is coiled in cavity 18 in the aforementioned figure-eight pattern. A gasket 26 of selected pliable material is fitted around each end of array 20, a gasket 26 being positioned at a port in each of the side walls 12A and 12B through which an end of the array passes, whereby the port will be sealed during array calibration.

FIGS. 1 and 2 show a lid or cover 28 for structure 10 which includes an upper wall 30 and further includes side walls 32A and 32B and 34A and 34B, all of which may usefully be formed of one inch plywood. Upper wall 30 is fixed in orthogonal relationship to sidewalls 32A, 32B, 34A and 34B along joints which are air tight, and each of the side walls 32A and 32B is fixed in orthogonal relationship to both side walls 34A and 34B along joints which are air tight. Each of the side walls of cover 28 has a lower edge which exactly matches one of the upper edges of a side wall of structure 10, side walls having matching edges respectively comprising side walls 32A and 12A, side walls 32B and 12B, side walls 34A and 14A, and side walls 34B and 14B. When cover 28 is placed upon structure 10 so that all matching side wall edges are in abutting relationship, an air tight joint is formed between cover 28 and each of the side walls 12A, 12B, 14A and 14B. The lower edges of side walls 32A and 32B are provided with semicircular indents 36 which fit around gaskets 26 when cover 28 is placed on structure 10 to compress the gaskets and seal the ports through which the ends of coiled array 20 pass. Consequently, when cover 28 is placed upon structure 10, cavity 18 is sealed or made air tight, sealed cavity 18 usefully having a length of 96 inches, a width of 48 inches and a height of 30 inches for calibrating a linear hydrophone array of 150 feet in length over a frequency range 2 Hz-32 Hz.

It is intended that cover 28 remain emplaced upon structure 10, and that cavity 18 remain air tight during calibration of hydrophone array 20. Consequently, latch members 37A are selectively positioned around sidewalls 32A, 32B, 34A and 34B, and mating latch members 37B are positioned around side walls 12A, 12B, 14A and 14B so that each latch member 37A may be locked to a latch member 37B when cover 28 is placed on structure 10. Lifting handles 38 may be selectively fixed to cover 28 to allow cover 28 to be readily moved by a small calibration crew of 2-4 persons.

While the embodiment of the invention shown in FIG. 1 seals a volume of air in cavity 18 for calibration, it is anticipated that in a modification of the invention, other gaseous fluids could be substituted therefor. For example, the frequency range of calibration could be changed by sealing gaseous fluid other than air within cavity 18, the dimensions of the cavity remaining unchanged.

Upper wall 30 of cover 28 has an inner surface, indicated in FIGS. 1 and 2 by reference numeral 40, which is adjacent to or faces toward cavity 18 when cover 28 is emplaced on structure 10, and which is rectangular shaped and has a length of 96 inches and a width of 48 inches, the dimensions thereof being equal to the dimensions of the inner surface of lower wall 16. The area of the inner surface of upper wall 30 is considered to comprise six segments equal in area, and a circular aperture penetrating upper wall 30 is centered at the center of each such segment. The diameter of each circular aperture is equal to the outer diameter of the cone of a conventional electro-acoustic speaker 42, each cone being joined to upper wall 30 about the circumference of an aperture to form an air-tight seal with upper wall 30. It will be readily apparent that when upper wall 30 is placed upon structure 10, each speaker 42, when driven, will project acoustic waves or signals downwardly through a discrete portion of the volume of cavity 18, each volume portion having a volume equal to one sixth the area of the inner surface of upper wall 26 multiplied by the height of cavity 18. Speakers 42 are connected in parallel to speaker driver 44, which is a conventional device for operating electro acoustic speakers 42 over a frequency range which includes the calibration frequency range. Consequently, all of the acoustic signals projected into cavity 18 are in phase and of the same frequency at any given time. It has been found that by distributing speakers 42 to project sound waves into discrete, equal volume portions of cavity 18, and by operating the distributed speakers in unison, standing wave interference generated in sealed cavity 18 is insufficient to prevent accurate and reliable calibration of hydrophone array 20.

Referring once again to FIG. 1, and also to FIGS. 2 and 3, there is shown a reference or fiducial hydrophone 46 positioned upon a stand 48, or otherwise supported within cavity 18, so that reference hydrophone 46 is positioned along the axis of one of the loops of the figure-eight pattern in which hydrophone array 20 is coiled in cavity 18. Reference hydrophone 46 is supported at a distance above lower wall 16 which is approximately equal to one half the height of the loop of the figure-eight pattern, so that hydrophone 46 is positioned at the center of the loop. It has been found that by so centering the reference hydrophone, calibration errors caused by slight variations in pressure fields at the highest frequencies are minimized.

To calibrate hydrophone array 20, the array is coiled in sealed cavity 18 as aforementioned, at least one end of array 20 being accessible outside of cavity 18. Each acoustic channel included in array 20 is electrically coupled to a standard electronic monitoring device 50, which is capable of indicating phase, sensitivity, voltage response or other desired characteristic of a signal coupled thereto from an acoustic transducer which is receiving pressure waves of selected frequency. A lead 52 is provided which passes through one of the gaskets 26 to likewise couple reference hydrophone 46 to monitor 50. When both a channel of the array, comprising a number of interconnected hydrophones as aforementioned, and the reference hydrophone are coupled to monitor 50, speaker driver 44 is operated to drive each of the speakers 42 in unison at a succession of frequencies included in the calibration frequency range, such as at 2, 4, 8, 16 and 32 Hz. At each frequency, selected characteristics of signals coupled to monitor 50 from both the channel of the array and reference hydrophone 46 are recorded and compared.

As aforementioned, array 20 may comprise either one or a plurality of acoustic channels. If array 20 is provided with more than one channel, the channels of the array are successively calibrated in the above manner.

If the walls forming cavity 18 are not sufficiently rigid or stiff, vibrations will be generated therein by the acoustic signals projected by speakers 42, and possibly by acoustic or seismic disturbances in the vicinity of the calibration apparatus. If such vibrations are present in the walls, and if they are transmitted to hydrophones of array 20 through the fluid contained in cavity 18, or of even more concern, through direct contact, the electrical signal coupled from array 20 to monitor 50 may be seriously distorted.

If the walls of enclosure 10 were made of concrete block or similar non-rigid or acoustically absorptive material, wall vibrations would not be too significant. However, to provide an embodiment of the present invention which is readily transportable, the walls thereof are disclosed as being constructed of thin wooden material, as aforementioned. Consequently, to stiffen or stabilize lower wall 16 of structure 10, a bed of sand 54 of selected thickness is placed upon a concrete pad 55, which rests upon a solid supporting horizontal surface. The outer surface of lowerwall 16 is in contact with the bed of sand 54, and enclosure 10 is seated therein and supported thereby during array calibration.

To stiffen or to provide rigidity to side walls 12A and 12B of enclosure 10, rigid linear bars 56, such as aluminum channels or the like, are detachably joined to both side walls 12A and 12B in spaced parallel relationship with one another and with the upper and lower edges of the side wall to which they are joined. Similarly, two linear bars 58, such as aluminum channels or the like, are detachably joined to both side walls 14A and 14B in spaced parallel relationship with one another and with the upper and lower edges of the side wall to which they are joined. Each end of each bar 58 is detachably joined to an end of a bar 56. By providing bars 56 and 58, enclosure 10 remains very portable, while the capability of the side walls thereof to resist vibrations caused by internal sound fields is substantially improved. Also, bars 56 and 58 resist deformation of cavity 18 when speakers 42 are projecting acoustic pressure fields thereinto.

To further reduce the adverse effects of vibrations of the side walls in the calibration of hydrophone array 20, means are provided within enclosure 10 for keeping all parts of the array from coming in contact with any of the side walls during calibration, whereby transfer of vibrations of the side walls to the array is prevented. Such means very usefully comprises a set of batten arrays 60. Each batten array comprises a number of battens 62 which are joined together in spaced parallel relationship. Each batten array 60 is fixed to lower wall 16, proximate to one of the side walls, by means of a hinge 64, shown in FIGS. 2 and 3, so that each batten array may move in one degree of freedom, toward or away from cavity 18. Each batten array is positioned so that it faces another batten array across cavity 18, and light flexible cable 66, such as shock cord, is stretched between each set of facing batten arrays to urge them toward one another. The battens 62 of a batten array 60 therefore urge a portion of hydrophone array 20 away from the side wall to which the batten array is proximate. The spacing between adjacent battens 62 of an array 60 is selected so that standing waves may not be generated in the space between a batten array 60 and the side wall to which it is proximate.

As aforementioned, the height of sealed cavity 18, the distance between the inner surfaces of lower wall 16 and upper wall 30, was usefully selected to be 30 inches for a calibration frequency range having an upper limit of 32 Hz. In order for effective calibration to take place in a sealed cavity, it is necessary that the wavelength of the acoustic signal at the upper frequency limit be substantial in relation to the height of cavity 18. It has been found that accurate and reliable calibrations can be made with the embodiment of the invention shown in FIGS. 1-3 if the ratio of the height of cavity 18 to the wavelength of the upper limiting acoustic signal is no greater than one-tenth.

In order to substantially increase the upper limit of the frequency at which hydrophone array 20 may be calibrated, the array may be calibrated while enclosed in a cavity which is filled with water rather than air. Referring to FIG. 4, there is shown a top loading pressure vessel 68 filled with water 70 and provided with a cover 72. When cover 72 is secured to vessel 68, a sealed cylindrically shaped cavity 74 is formed therein having a diameter of 4 feet and a height of 4 feet. A pump 76 is coupled to pressure vessel 68 to facilitate the filling of the vessel 68 with water after the cover 72 is in place, this being accomplished by filling thru valve XX in vessel 68 as air escapes thru valve YY in cover 72 until water flows thru the latter.

Referring further to FIG. 4, there is shown an acoustic projector 78 positioned along the cylindrical axis of cavity 74 for projecting acoustic signals at each of the calibration frequencies outwardly from the axis toward the inner walls of the pressure vessel. FIG. 4 also shows hydrophone array 20 helically coiled around a spool or bobbin 80, reference hydrophone 46 also being coupled to bobbin 80. The dimensions of bobbin 80 in relation to the inner dimensions of pressure vessel 68 are such that bobbin 80 may be received within cavity 74 when array 20 is coiled around bobbin 80, the axis of the coiled array being concentric with the axis of cavity 74.

To calibrate hydrophone array 20 by means of the modification shown in FIG. 4, array 20 and bobbin 80 are received into pressure vessel 68, the pressure vessel being filled with fresh water or water of selected salinity and lid 72 is sealably secured to vessel 68. Both hydrophone 46 and each end of each channel of array 20 are electrically coupled by means of a lead 82, passing through the wall of vessel 68, to monitor 50, previously described. Pump 76 is adjusted to provide a selected hydrostatic pressure within cavity 74, and each channel of array 20 is successively calibrated over a range of acoustic signals, provided by successive adjustments of projector 78. Pump 76 may be successively adjusted so that each of the acoustic channels of hydrophone 20 may be calibrated over a range of hydrostatic pressures as well as over a range of acoustic frequencies.

The modification shown in FIG. 4 may also be employed to provide a very expedient means to determine the buoyancy of hydrophone array 20, a parameter which may be very useful when array 20 is to be deployed in an ocean environment. To determine buoyancy, a scale 84 is provided from which bobbin 80 is suspended as array 20 and bobbin 80 are lowered into vessel 68. By knowing the weight of bobbin 80, the buoyancy of array 20 may be readily determined from scale 84 when the bobbin is immersed in water 70, since the scale 84 will thereupon indicate the amount of force required to maintain the bobbin and the array in a state of neutral buoyancy.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for calibrating an elongated array of electrically interconnected hydrophones over a range of acoustic signal frequencies having lower and upper frequency limits comprising:

means for simultaneously enclosing all of the hydrophones of said elongated array in a single sealed cavity containing a selected fluid;

means for projecting an acoustic signal of a frequency selected from said frequency range into said sealed cavity to generate an array response signal which represents the combined individual responses of said enclosed hydrophones to said projected acoustic signal;

reference hydrophone means contained within said sealed cavity for generating a reference signal in response to said projected acoustic signal; and means coupled to said reference hydrophone means for enabling a selected characteristic of said reference signal to be compared with the same characteristic of said array response signal.

2. Apparatus for calibrating an elongated array of electrically interconnected hydrophones over a range of acoustic signal frequencies having a lower frequency limit which is on the order of 1 Hz, said apparatus comprising:

container means having a sealed cavity of selected dimensions for sealing said hydrophone array in a selected fluid;

a plurality of electro acoustic projecting means, each of said projecting means for projecting acoustic signals selected from said frequency range into a different portion of the volume of said sealed cavity, the dimensions of each of said volume portions being equal;

means coupled to said speaker means for driving said projecting means so that all of the acoustic signals projected into said sealed cavity by said speaker means at a given time are in phase and of the same frequency;

reference hydrophone means contained within said sealed cavity for generating a reference signal in response to each of said projected acoustic signals; and means coupled to said reference hydrophone means for enabling a selected characteristic of one of said reference signals to be compared with the same characteristic of a signal generated by said hydrophone array when an acoustic signal is projected into said sealed cavity.

3. The apparatus of claim 2 wherein said fluid comprises air and wherein:

said container means comprises a plurality of flat walls which are joined to form said sealed cavity, one of said walls comprising a first wall for containing said speaker means, and other of said walls being provided with rigid means for resisting vibration of said other walls.

4. The apparatus of claim 3 wherein:

said first wall of said container means and a second wall of said container means are in spaced parallel relationship, said first wall and said second wall both having flat rectangular surfaces facing toward said sealed cavity, said rectangular surfaces being separated by a linear dimension which is substantially smaller than the wavelength of an acoustic signal having a frequency equal to the upper frequency limit of said frequency range.

5. The apparatus of claim 2 wherein said apparatus is portable and wherein said container means comprises:

a flat rectangular lower wall having an outer surface which faces away from said sealed cavity;

two flat rectangular first side walls fixed in spaced parallel relationship with each other, and in orthogonal relationship with said lower wall, each of said first side walls having an upper edge, a lower edge, side edges, and an outer surface facing away from said sealed cavity, the lower edge of each of said first side walls and an edge of said lower wall forming a joint which is air tight;

two flat rectangular second side walls fixed in spaced parallel relationship with each other, and in orthogonal relationship with said lower wall and with each of said first side walls, each of said second side walls having an upper edge, a lower edge, side edges, and an outer surface facing away from said sealed cavity, the lower edge of each of said side walls and an edge of said lower wall forming a joint which is air tight, an edge of each of said second side walls having a side edge which forms an air tight joint with a side edge of each of said first side walls;

a cover for forming air tight seals with said first and said second side walls when said hydrophone array is being calibrated, said cover including a flat rectangular upper wall;

stiffening means adjacent to said lower wall and to said first and second side walls for resisting variation in the dimensions of said sealed cavity when acoustic signals are projected into said sealed cavity and for resisting vibrations of said lower wall and of said first and second side walls generated either by said projected acoustic signals or by acoustic disturbances occurring external to said container means; and means contained within said sealed cavity for preventing said hydrophone array from contacting said first and second side walls when said hydrophone array is being calibrated.

6. The apparatus of claim 5 wherein:

said upper wall and said lower wall each has a flat inner surface facing toward said sealed cavity, said inner surfaces being separated by a linear dimension which is less than one-tenth of the wavelength of an acoustic signal having a frequency equal to the upper frequency limit of said frequency range.

7. The apparatus of claim 5 wherein said stiffening means comprises:

a bed of sand in contact with the other surface of said lower wall, said container means being seated upon said bed of sand;

a selected number of rigid linear first bar members detachably joined to each of said first side walls, the first bar members joined to a given one of said first side walls being in spaced parallel relationship with one another and with the upper and lower edges of said given first side wall; and a selected number of rigid linear second bar members detachably joined to each of said second side walls, the second bar members joined to a given one of said second side walls being in spaced parallel relationship with one another and with the upper and lower edges of said given second side wall, each of said second bar members being detachably joined to one of the first bar members which is detachably joined to each of said first side walls.

8. The apparatus of claim 5 wherein said hydrophone array comprises an elongated array which is wound in a coil during calibration, said reference hydrophone means being placed at the center of a loop of said coil, and wherein:

said comparison enabling means comprises means for enabling the signal strength and phase of one of said reference signals to be compared with the signal strength and phase of a signal generated by said hydrophone array when an acoustic signal is projected into said sealed cavity.

9. The apparatus of claim 1 wherein:

said enclosing means comprises a pressure vessel for providing a sealed cylindrically shaped cavity of selected radius and height which is filled with a selected liquid when said hydrophone array is calibrated;

said projecting means comprises means for projecting acoustic signals from the cylindrical axis of said sealed cavity outwardly toward inner walls of said pressure vessel when said pressure vessel is filled with water; and said apparatus further includes means coupled to said pressure vessel for providing a selected hydrostatic pressure within said pressure vessel.

10. The apparatus of claim 9 wherein said hydrophone array comprises a linear hydrophone array, and wherein said apparatus further comprises:

a bobbin which is receivable into the sealed cavity provided by said pressure vessel when said elongated hydrophone array is helically wound around said bobbin; and means for determining the buoyancy of said elongated hydrophone array.

11. A method for calibrating an elongated array of electrically interconnected hydrophones over a range of acoustic signal frequencies having lower and upper frequency limits, said method comprising the steps of:

coiling said hydrophone array in a cavity filled with a selected fluid, said coil having a loop of selected height;

placing a reference hydrophone in said cavity in selected relationship with said coiled hydrophone array, said reference hydrophone generating a reference signal upon receiving an acoustic signal;

sealing said cavity to retain said fluid in said cavity when said hydrophone array is calibrated;

projecting acoustic signals of frequencies selected from said frequency range into said sealed cavity; and comparing a selected characteristic of a reference signal generated by said reference hydrophone in response to a given projected acoustic signal with the same characteristic of a signal generated by said hydrophone array in response to said given acoustic signal.

12. The apparatus of claim 11 wherein said range of acoustic signal frequencies has a lower limit on the order of 1 Hz and wherein:

said step of placing said reference hydrophone in said cavity comprises the step of placing said reference hydrophone along the axis of said loop of said coil at a position which is half way along said axis.

* * * * *